Nov. 4, 1952      B. M. MATHIAS      2,616,506
WIND-OPERATED POWER GENERATOR
Filed March 22, 1949      2 SHEETS—SHEET 1
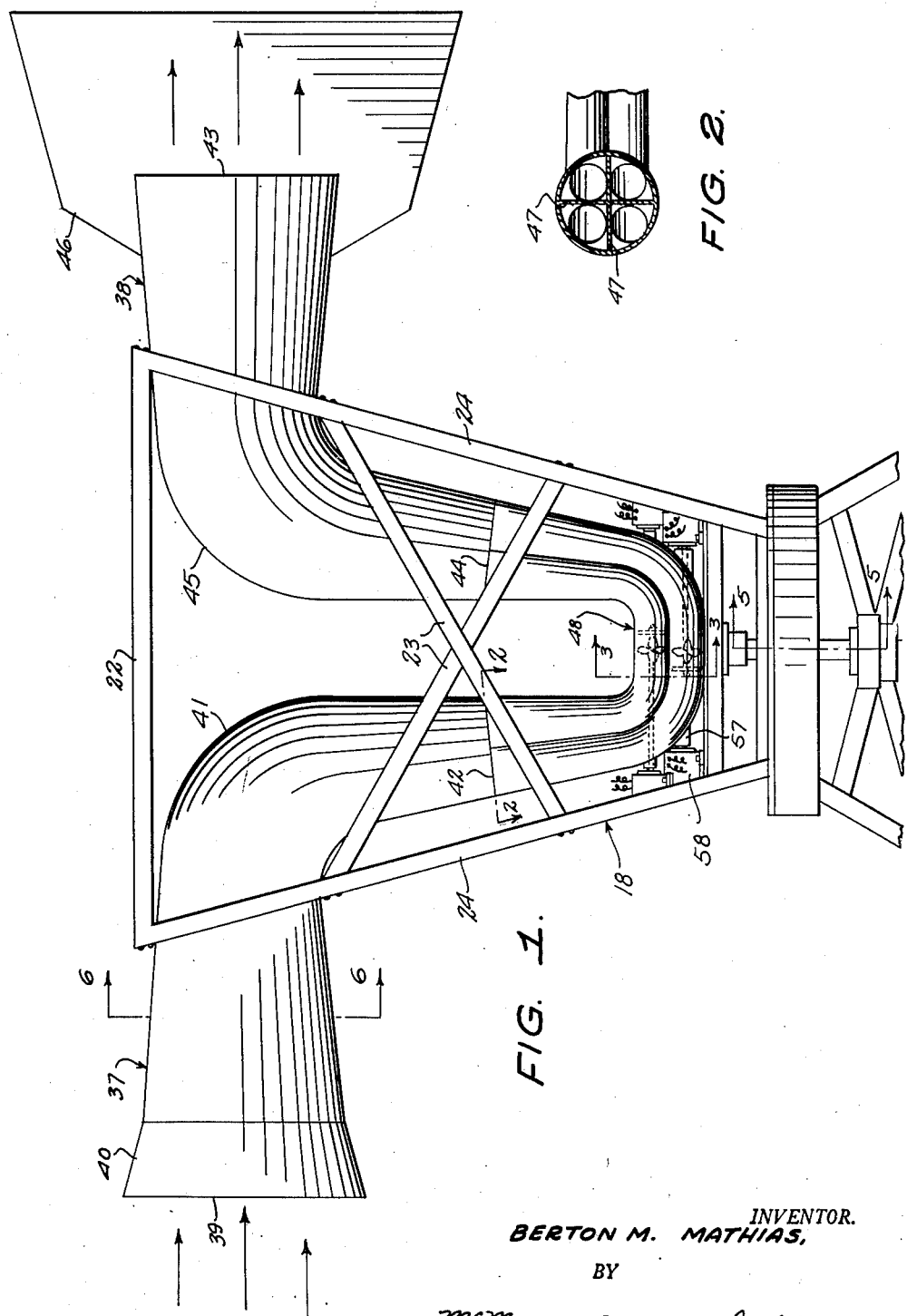
INVENTOR.
BERTON M. MATHIAS,
BY
McMorrow, Berman + Davidson
ATTORNEYS.

Nov. 4, 1952 B. M. MATHIAS 2,616,506
WIND-OPERATED POWER GENERATOR
Filed March 22, 1949 2 SHEETS—SHEET 2
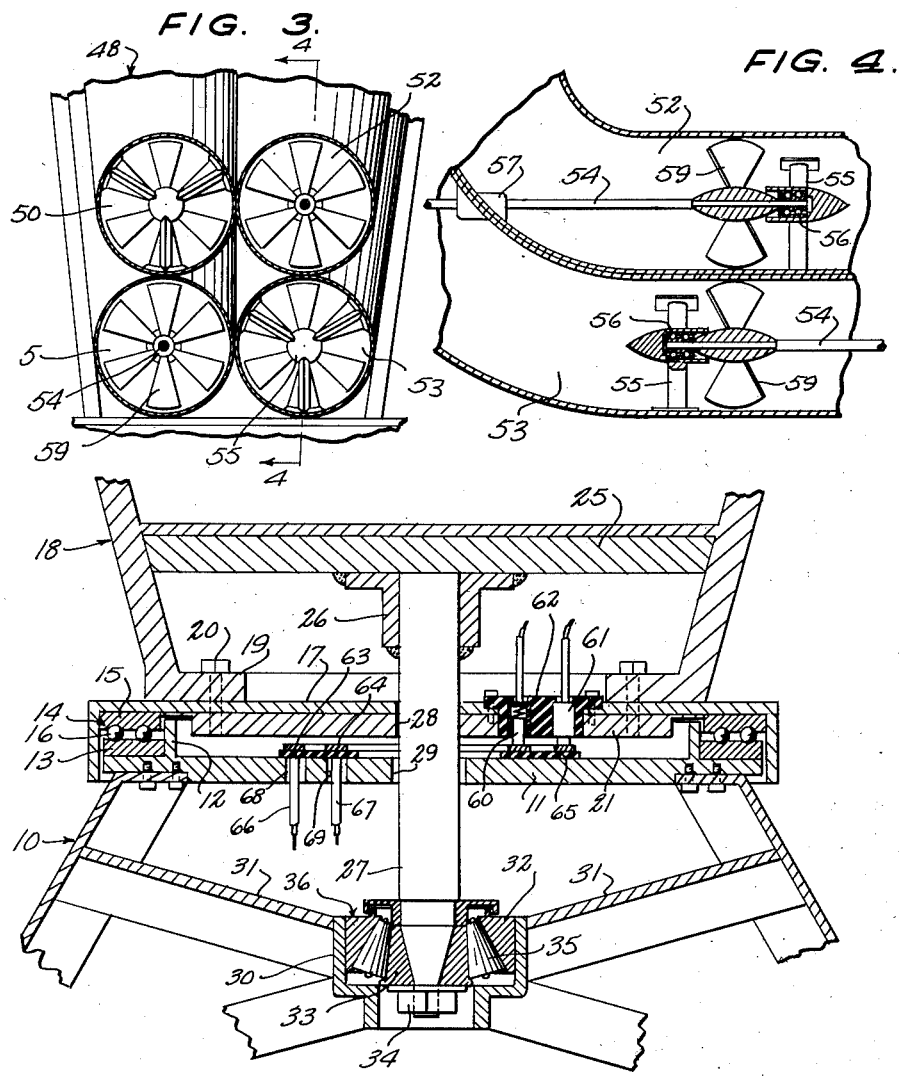
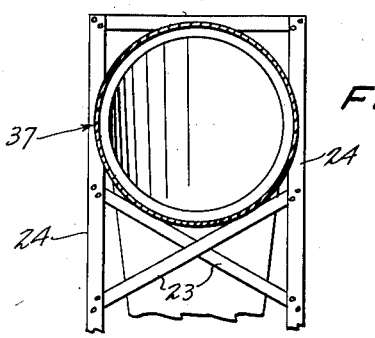
INVENTOR.
BERTON M. MATHIAS,
BY
McMorrow, Berman + Davidson
ATTORNEYS.

Patented Nov. 4, 1952

2,616,506

UNITED STATES PATENT OFFICE 2,616,506

WIND-OPERATED POWER GENERATOR

Berton M. Mathias, Monte Vista, Colo.

Application March 22, 1949, Serial No. 82,899

1 Claim. (Cl. 170—40)

This invention relates to wind-operated power generators, and more particularly to a generator for generating electric power from the energy of the wind.

It is among the objects of the invention to provide an improved, wind-operated, electric power generator which uses wind-driven rotors of extremely small size in comparison to the amount of wind energy converted into electric power to avoid the difficulties inherent in the use of large rotors, and which so magnifies the density and velocity of the air applied to the rotors that the rotors can be operated at high speed and maximum efficiency, which utilizes both the ram and suction effects of the wind to increase the density and velocity of the air at the rotors, and which is easy to support, is not subject to damage by winds of high velocity, is substantially self-governing, and is simple and durable in construction, and economical to manufacture even in extremely large sizes.

Other objects and advantages will become apparent from a consideration of the following description and the appended claim in conjunction with the accompanying drawings, wherein:

Figure 1 is a side elevation of a wind-operated power generator illustrative of the invention;

Figure 2 is a transverse cross-section on the line 2—2 of Figure 1;

Figure 3 is a transverse cross-section on the line 3—3 of Figure 1;

Figure 4 is a longitudinal cross-section of a fragmentary portion of the generator taken on the line 4—4 of Figure 3;

Figure 5 is a diametrical cross-section of the generator support structure taken on the line 5—5 of Figure 1, and shown on an enlarged scale; and Figure 6 is a transverse cross-section on the line 6—6 of Figure 1.

With continued reference to the drawings, the generator includes a structural steel tower, generally indicated at 10, which is preferably of large size and of sufficient height to position the wind-receiving portion of the generator well above adjacent ground obstructions to the steady flow of the wind.

A circular disc or cap plate 11 is secured on the top end of the tower and is provided near its outer edge with an upstanding, annular flange 12, the outer side of which, and the adjacent marginal portion of the plate provide a seat for the lower race 13 of an anti-friction thrust bearing, generally indicated at 14. The upper race 15 of the thrust bearing is carried on the lower race by suitable anti-friction elements, such as the balls 16, and an upper turntable plate 17 marginally overlies the upper race of the thrust bearing and is supported by the thrust bearing in spaced, substantially parallel relationship to the lower turntable plate or disc 11.

A trapezoidal frame structure, generally indicated at 18, has its smaller end 19 resting upon the upper surface of the upper turntable plate 17, and secured to this plate by suitable means, such as the cap screws 20, the cap screws being threaded through the plate 17 and into a reinforcing plate 21 secured to the under surface of the plate 17 substantially concentric with the latter.

The trapezoidal frame 18 is rectangular in cross-sectional shape and increases upwardly in both width and thickness, so that the shape of its rectangular upper end is similar to, but larger than the shape of its rectangular lower end 19. The upper end 22 of the frame is spaced above and substantially parallel to the plate 17 and the frame is reinforced by suitable diagonal braces 23 extending between the opposite corner posts 24 at the same sides of the frame.

The frame 18 carries a transverse floor 25 above and substantially parallel to its lower end 19, and a cylindrical socket 26 is secured to the under side of the floor 25 substantially at the center thereof and projects downwardly from the floor. A spindle shaft 27 is secured at its upper end in the socket 26 and extends downwardly through the bottom end of the frame 18 and through respective centrally-disposed apertures 28 and 29 in the upper and lower turntable plates 17 and 11. A cylindrical socket 30 is secured to the tower 10 below the turntable plate 11 by a spider structure 31 extending across the cross-sectional area of the tower near the plate 11, and the outer race 32 of a tapered, roller bearing is secured in the socket 30 by suitable means, such as welding.

An inner bearing race 33 is secured on the tapered lower end of spindle shaft 27 by a nut 34 threaded onto the screw-threaded, lower end portion of the shaft, and anti-friction bearing rollers 35 are operatively disposed between the races 32 and 33. By means of the ball thrust bearing, generally indicated at 14, and the tapered roller bearing, generally indicated at 36, secured between the tower and the lower end of the spindle shaft, the frame 18 is mounted on the upper end of the tower 10 for free rotation about a substantially vertical axis, but is firmly held against any other movement relative to the tower.

A wind-intake scoop, generally indicated at 37, is supported by the frame 24 and projects outwardly from one edge of the frame, and a wind-outlet spout, generally indicated at 38 is also supported by the frame 18 and projects outwardly from the opposite edge of the latter.

The scoop 37 has a large intake end 39 provided with a funnel structure 40 disposed outwardly of the upper end 22 of the frame and is of elbow shape having a substantially right-angle bend 41 just within the corresponding corner posts 24 of the frame, so that its portion inwardly of the bend extends downwardly in the frame substantially parallel to the adjacent frame corner post. This scoop 37 tapers gradually from its inlet end 39 to its smaller, outlet end 42 within the frame, so that air driven into the inlet end by the force of the wind will be increased in density and velocity as it passes inwardly and downwardly through the air-intake scoop. The taper of the scoop may be mathematically calculated to provide the desired terminal density and velocity for a given range of wind velocities at the inlet or intake end.

The outlet spout, generally indicated at 38, may be of substantially the same size and shape as the intake scoop 37, and has a large outer end 43 disposed outwardly of the upper end 22 of the frame, and a smaller, inner end 44 disposed within the frame. This spout is also of elbow shape having intermediate its length a substantially right-angular bend 45, so that its portion inwardly of the bend is substantially perpendicular to the adjacent corner post 24 of the frame, and a large vane 46 is attached to the outlet spout 38 near its large outlet end to hold the intake scoop 37 and outlet spout 38 substantially parallel to the direction of the wind.

Near its smaller end the scoop 38 is internally divided into four substantially equal quadrants by a pair of mutually perpendicular partitions 47, and the outlet spout 38 is similarly divided near its outer end by a pair of mutually perpendicular partitions, not illustrated.

A restricted, multi-passage throat, generally indicated at 48, is connected at one end to the smaller end of the scoop 37 and at its opposite end to the smaller end of the spout 38. This throat 48 is U-shaped and gradually changes from a substantially circular cross-sectional shape at each end divided into four quadrant-shaped spaces to four separate cylindrical passages through its intermediate or bight portion, the four throat passages being indicated at 50, 51, 52 and 53 in Figures 3 and 4.

By providing the intake scoop 37 and the outlet spout 38 as right-angle structures and connecting their smaller inner ends by a U-shaped throat structure, the distance between the large ends of the scoop and the spout is maintained at a reduced value, so that the device is easy to support and is not seriously affected by winds of high velocity and at the same time, a length of air passage through the device sufficient to provide the desired compression and velocity increase of the air at the most efficient rate, is maintained.

Respective generator drive shafts 54 extend longitudinally through the several throat passages 50, 51, 52 and 53 and are substantially concentric with the corresponding cylindrical passages. Respective bearing spiders 55 secured in the passages carry respective anti-friction bearings 56 in which the inner ends of the corresponding shafts 54 are journaled, and the shafts are also journaled in respective bearings 57 secured to the walls of the throat passages at the locations at which the several shafts pass through the walls of the respective passages. Preferably, two of the shafts project outwardly of the throat structure at one side of the latter, and the other two project outwardly of the throat structure at the opposite side of the latter, as is particularly illustrated in Figure 1.

A respective electric generator 58 is drivenly connected to the outer end of each shaft 54, these generators being disposed entirely outside of the throat structure 48, so as not to interfere with the passage of air through the throat passages, and being supported by the frame 18.

A respective radial flow rotor 59 is mounted on each shaft 54 adjacent the corresponding bearing spider 55. These rotors have diameters substantially equal to the inside diameters of the corresponding throat passages, and are designed for high-speed, high-efficiency operation. The size of the rotors 59 is extremely small, but the quantity of power delivered by the rotors is maintained large by the increase in the velocity and density of the air applied to the rotors by reason of the tapered construction of the air-intake scoop 37 and the air-outlet spout 38, and the restriction of the throat passages in the throat structure 48.

The generators 58 are collectively connected at opposite sides to two brushes 60 and 61 which are carried by the upper turntable plate 17 and electrically insulated from the latter by a block 62 of insulating material disposed in an aperture in the plate 17 and provided with apertures in which the brushes 60 and 61 are seated. These brushes contact respective slip rings 63 and 64 supported upon the lower turntable plate 11 and insulated therefrom by an annular body 65 of insulating material disposed between the rings and the lower plate. Respective conductors 66 and 67 extend from the rings 63 and 64 through respective apertures 68 and 69 in the lower turntable plate, and are connected to any device to which the generated power is to be supplied.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A wind-operated mechanism comprising a supporting tower, a frame mounted on said tower for rotation about a substantially vertical axis, a tapered air-intake scoop and a tapered air-outlet spout carried by said frame with said air-outlet spout oppositely directed to said intake scoop, a restricted throat structure connected between the smaller ends of said intake scoop and outlet spout, a shaft extending longitudinally into said throat structure concentrically thereof, and an air-driven rotor mounted on said shaft within said throat, said intake scoop and said outlet spout each having a substantially right-angle bend intermediate its length and said throat structure having a U-shaped formation, said intake scoop and said outlet spout having their portions inwardly of the respective bends convergingly inclined downwardly in said frame, and said U-shaped throat structure being disposed and having its opposite ends in communication with the lower, smaller ends of said scoop and said spout, whereby the distance between the inlet end of said scoop and the outlet end of said spout is materially less than the length of the air passage through said scoop, said spout and said throat structure.

BERTON M. MATHIAS.

REFERENCES CITED

The following references are of record in the file of this patent:

UNITED STATES PATENTS

| Number | Name | Date |
|---|---|---|
| 264,164 | Jackson | Sept. 12, 1882 |
| 672,877 | Guillott | Apr. 23, 1901 |
| 695,524 | Woodell | Mar. 18, 1902 |
| 875,290 | Ruggles | Dec. 31, 1907 |
| 984,599 | Pichault | Feb. 21, 1911 |
| 1,013,798 | Messina | Jan. 2, 1912 |
| 1,025,428 | Stanschus | May 7, 1912 |
| 1,345,022 | Oliver | June 29, 1920 |
| 1,496,767 | Bonetto | June 10, 1924 |
| 1,783,669 | Oliver | Dec. 2, 1930 |
| 1,876,595 | Beldimano | Sept. 13, 1932 |
| 1,903,307 | Gillio | Apr. 4, 1933 |

FOREIGN PATENTS

| Number | Country | Date |
|---|---|---|
| 142,137 | Austria | June 25, 1935 |
| 529,301 | France | Sept. 6, 1921 |
| 605,673 | Germany | Aug. 29, 1935 |

OTHER REFERENCES

"Electronics," December 1945, pages 98 to 103.